(12) United States Patent
Rusch et al.

(10) Patent No.: US 11,041,996 B2
(45) Date of Patent: Jun. 22, 2021

(54) WAVE CONDUCTOR, WAVEGUIDE CONNECTOR, AND COMMUNICATIONS LINK

(71) Applicants: TE Connectivity Germany GmbH, Bensheim (DE); Huber + Suhner AG, Herisau (CH)

(72) Inventors: Christian Rusch, Waldsee (DE); Carlos Almeida, Reinheim (DE); Gunther Mumper, Egelsbach (DE); Stefan Glaser, Heppenheim (DE); Rolf Jetter, Darmstadt (DE); Jorg Bieber, Darmstadt (DE); Martin Seifert, Bensheim (DE); Andreas Engel, Frankisch-Crumbach (DE); Wolfgang Muller, Darmstadt (DE); Lam Nyguyen Nhu, Bensheim-Auerbach (DE); Ulf Hugel, Herisau (CH)

(73) Assignees: TE Connectivity Germany GmbH, Bensheim (DE); Huber + Suhner AG, Herisau (CH)

( * ) Notice: Subject to any disclaimer, the term of this patent is extended or adjusted under 35 U.S.C. 154(b) by 0 days.

(21) Appl. No.: 16/040,928

(22) Filed: Jul. 20, 2018

(65) Prior Publication Data

US 2019/0025525 A1    Jan. 24, 2019

(30) Foreign Application Priority Data

Jul. 20, 2017 (DE) .......................... 102017116347.6

(51) Int. Cl.
*G02B 6/38* (2006.01)
*H01P 3/16* (2006.01)
(Continued)

(52) U.S. Cl.
CPC ........... *G02B 6/3873* (2013.01); *G02B 6/262* (2013.01); *G02B 6/4292* (2013.01); *G02B 6/443* (2013.01);
(Continued)

(58) Field of Classification Search
CPC ...... G02B 6/3873; G02B 6/262; G02B 6/443; G02B 6/4292; H01P 3/20
See application file for complete search history.

(56) References Cited

U.S. PATENT DOCUMENTS 3,936,142 A * 2/1976 Kersten ................. G02B 6/255
                                                            385/39
5,159,652 A * 10/1992 Grassin D'Alphonse ..................
                                                            G02B 6/3831
                                                            385/53
(Continued)

FOREIGN PATENT DOCUMENTS

GB       1473655         5/1977
WO    2004027482 A1     4/2004

OTHER PUBLICATIONS

European Patent Office Communication, dated May 14, 2020, 9 pages.

*Primary Examiner* — Andrew Jordan
(74) *Attorney, Agent, or Firm* — Barley Snyder

(57) ABSTRACT

A wave conductor for electromagnetic waves, waveguide connector and communications link
A wave conductor for electromagnetic waves, preferably a millimeter-wave wave conductor, in particular for a digital communication application, with a conductor core and a one conductor sheathing. The conductor sheathing surrounds the conductor core at least partially in the longitudinal direction and at least partially in the circumferential direction of the wave conductor. One longitudinal section of the wave con-
(Continued)

ductor has cross-sections which deviate from a circle at the outside of the wave conductor and/or at the outside of the conductor sheathing.

Further, a waveguide connector for electromagnetic waves, preferably millimeter-wave waveguide connectors, in particular flying or installable waveguide connectors for a wave conductor. The waveguide connector has a wave conductor plug-in recess in which a longitudinal section of the wave conductor is directly placeable. The wave conductor plug-in recess has an inner circumference coding formation by means of which the wave conductor is placeable in at least one specific orientation in the wave conductor plug-in recess.

19 Claims, 2 Drawing Sheets

(51) Int. Cl.
　　 G02B 6/26　　　(2006.01)
　　 G02B 6/42　　　(2006.01)
　　 G02B 6/44　　　(2006.01)
　　 H01P 3/20　　　(2006.01)
　　 G02B 6/36　　　(2006.01)
(52) U.S. Cl.
　　 CPC ............... *H01P 3/165* (2013.01); *H01P 3/20* (2013.01); *G02B 6/36* (2013.01)

(56)　　　　　　　　References Cited

U.S. PATENT DOCUMENTS

| | | | | |
|---|---|---|---|---|
| 6,422,762 B1* | 7/2002 | Rucks | ................ | G02B 6/4202 385/15 |
| 6,655,851 B1* | 12/2003 | Lee | ................ | G02B 6/3843 385/78 |
| 6,967,347 B2* | 11/2005 | Estes | ................ | B82Y 10/00 257/25 |
| 7,255,489 B2* | 8/2007 | Krahenbuhl | ......... | G02B 6/4204 385/88 |
| 8,412,013 B2* | 4/2013 | Shiobara | ................ | G02B 6/443 385/100 |
| 8,794,849 B2* | 8/2014 | Gurreri | ................ | G02B 6/3881 385/58 |
| 8,807,843 B2* | 8/2014 | Gurreri | ................ | G02B 6/3873 385/58 |
| 8,905,647 B2* | 12/2014 | Gurreri | ................ | G02B 6/26 385/58 |
| 9,112,253 B2* | 8/2015 | Payne | ................ | H01P 3/16 |
| 9,350,063 B2* | 5/2016 | Herbsommer | ......... | H05K 1/024 |
| 9,912,030 B2* | 3/2018 | Morgan | ................ | H01P 3/16 |
| 9,912,032 B2* | 3/2018 | Morgan | ................ | H01P 3/16 |
| 2003/0219214 A1* | 11/2003 | Lee | ................ | G02B 6/3843 385/78 |
| 2004/0069984 A1* | 4/2004 | Estes | ................ | B82Y 10/00 257/25 |
| 2005/0259924 A1* | 11/2005 | Krahenbuhl | ......... | G02B 6/4204 385/88 |
| 2006/0038168 A1* | 2/2006 | Estes | ................ | B82Y 10/00 257/25 |
| 2009/0034922 A1* | 2/2009 | Yasutomi | ................ | G02B 6/443 385/113 |
| 2012/0020632 A1* | 1/2012 | Shiobara | ................ | G02B 6/443 385/114 |
| 2014/0161392 A1* | 6/2014 | Gurreri | ................ | G02B 6/3831 385/59 |
| 2014/0233892 A1* | 8/2014 | Gurreri | ................ | G02B 6/36 385/59 |
| 2015/0185425 A1* | 7/2015 | Gundel | ................ | G02B 6/4292 455/90.2 |
| 2015/0301275 A1* | 10/2015 | Andie | ................ | G02B 6/293 385/43 |
| 2016/0240907 A1* | 8/2016 | Haroun | ................ | H01P 3/16 |
| 2017/0040659 A1* | 2/2017 | Morgan | ................ | H01P 3/165 |
| 2017/0077581 A1* | 3/2017 | Nickel | ................ | H01P 1/02 |
| 2017/0170539 A1* | 6/2017 | Morgan | ................ | H01P 3/16 |
| 2017/0170540 A1 | 6/2017 | Morgan et al. | | |
| 2018/0198184 A1* | 7/2018 | Onishi | ................ | H01P 3/122 |
| 2018/0212330 A1* | 7/2018 | Wertsberger | ......... | G02B 6/293 |
| 2018/0301782 A1* | 10/2018 | Rusch | ................ | H01P 3/16 |
| 2019/0025525 A1* | 1/2019 | Rusch | ................ | G02B 6/262 |
| 2019/0081705 A1* | 3/2019 | Braunisch | ............ | H04B 10/516 |
| 2019/0097293 A1* | 3/2019 | Dogiamis | ................ | H01P 3/122 |
| 2019/0148808 A1* | 5/2019 | Nakajima | ................ | H01P 5/107 |

* cited by examiner

WAVE CONDUCTOR, WAVEGUIDE CONNECTOR, AND COMMUNICATIONS LINK

CROSS-REFERENCE TO RELATED APPLICATION

This application claims the benefit of the filing date under 35 U.S.C. § 119(a)-(d) of German Patent Application No. 102017116347.6 filed on Jul. 20, 2017.

FIELD OF THE INVENTION

The present invention relates, in general, to a wave conductor for electromagnetic waves, and, in particular for a digital communication application. The present invention further relates to a waveguide connector, preferably a millimeter-wave waveguide connector, in particular a flying or installable waveguide connector for a wave conductor. Moreover, the present invention relates to a ready-made wave conductor, in particular a ready-made millimeter-wave wave conductor. In addition, the present invention relates to a communication link, preferably a millimeter-wave communication link. Moreover, the present invention relates to a unit, a device, a subassembly, a module, an appliance and an installation.

BACKGROUND

A transmission of data plays an important role in the development of the electrical and electronic markets. Today, these requirements on data transmission are a vital part of every sector of industry, for example the electrical industry, the automotive industry, the metal industry, etc. In this case, wide product ranges of electrical, optical and electro-optical links are required which guarantee high data transmission rates. These are, for example in a modern motor vehicle, infotainment/entertainment applications and traffic information which are preferably exchanged via an optical bus of a multimedia network of the motor vehicle. For this and also other optical data transmission technologies, optical links (glass or plastics material wave conductor, (hybrid connector) (plug connector) with optical and/or electrical contacts etc., are required which couple the optical or opto-electronic components with one another in an optical manner.

Dielectric wave conductors, fibers, cables, etc. can be implemented in order to transmit signals in the millimeter range with comparatively low losses. This can be useful for communication links with high data rates (greater than 10 Gbits/s). The idea is to generate an electromagnetic wave which expands along the wave conductor. If the wave conductor consists of a pure dielectric, (i.e., has no metal), an electromagnetic field distribution of the progressive wave is divided into two sections which extend inside the dielectric and inside the medium (mostly air) surrounding the wave conductor.

In order to reduce the electromagnetic field in the environment of the waveguide and be able to securely maintain a communication link, the wave conductor can be constructed from different layers of material. The field is focused in a conductor core of the waveguide with a comparatively high dielectric constant, with a conductor sheathing of the waveguide being able to be manufactured from one or more layers of materials with comparatively lower dielectric constants. The application of a conductor core which has rectangular cross-sections defines a polarization of a waveguide mode. In comparison to a conductor core which has circular cross-sections, the electromagnetic wave has a defined polarization direction.

In an optical plug-in connection or an optical port (both: connectors), an outwardly non-circular conductor core of a wave conductor must have a specific orientation, in order to reduce optical coupling losses.

SUMMARY

A problem to be solved is to specify an improved communication link, preferably an improved millimeter-wave communication link, for electromagnetic waves. In this context, at least one specific orientation of an outwardly non-circular conductor core of a wave conductor, in particular a millimeter-wave wave conductor, should be ensured. Moreover, a wave conductor and a waveguide connector for electromagnetic waves are consequently intended to be specified.

The problem is solved by the present invention is by providing: (a) a wave conductor for electromagnetic waves, preferably a millimeter-wave wave conductor, in particular for a digital communication application; (b) means of a waveguide connector, preferably a millimeter-wave waveguide connector, in particular a flying or installable waveguide connector, for a wave conductor; (c) means of a communication link, preferably a millimeter-wave communication link; and (d) means of a unit, a device, a subassembly, a module, an appliance and an installation. Advantageous further developments, additional features and/or advantages of the invention are evident from the dependent claims and the following description.

The inventive wave conductor comprises at least one conductor core and at least one conductor sheathing, the conductor sheathing surrounding the conductor core at least partially in the longitudinal direction and at least partially in the circumferential direction of the wave conductor, at least one longitudinal section of the wave conductor possessing cross-sections which deviate from a circle at the outside of the wave conductor and/or at the outside of the conductor sheathing. "Outside" is intended to be understood here and subsequently to mean radially outside, with an outer side of the conductor core being provided inside the wave conductor, for example. Furthermore, at the outside of the wave conductor can be understood to mean a ferrule or the like (see below), for example made of a metal or of a plastics material, which is provided on the outside of the longitudinal section (longitudinal end section) of the conductor sheathing (crimped, glued, laser-welded, etc.).

Preferably, the conductor sheathing surrounds the conductor core at least over a substantial or complete extent of the conductor core in the longitudinal direction of the wave conductor and/or over a substantial or complete extent of the conductor core in the circumferential direction of the wave conductor. Furthermore, this means that the cross-section in question is not formed circular at the outside of the conductor sheathing and more or less deviates from a circle at the outside of the conductor sheathing. In this case, this cross-section is perpendicular to the longitudinal direction of the wave conductor. The wave conductor can also be described as a cable, a light wave guide (LWL), fiber or the like.

As a result of this, a defined positional relationship of the conductor core or an (outer) geometry of the conductor core arises at least in the longitudinal section, in particular if the cross-section thereof deviates from that of a circle, relative to an (outer) geometry of the longitudinal section, which can be implemented for an orientated advancing, for example an insertion, of the wave conductor. This of course also relates respectively to only one section of these geometries (related curves, corners, edges, etc.). An orientation is in this case intended to be understood to mean at least a (twisting) rotational position of the longitudinal section in the longitudinal direction of the wave conductor relative to a wave conductor plug-in recess, for example of a waveguide connector (flying (loose), installed), also in the longitudinal direction.

A conductor core of a dielectric wave conductor should preferably be distinguished from a conductor sheathing in that a dielectric constant of this conductor core is greater than a dielectric constant of this conductor sheathing. This also means that a central layer of, for example, three layers in a wave conductor can be a conductor sheathing with respect to an inner layer and a conductor core with respect to an outer layer. A preferable communication application operates at frequencies of less than 50 GHz to over 300 GHz at possible transmission rates of preferably more than 10 Gbit/s.

In embodiments, a related or the longitudinal section of the wave conductor or of the conductor sheathing can be formed: (a) as a longitudinal section of a longitudinal end section of the wave conductor or of the conductor sheathing; (b) as a longitudinal end section of the wave conductor or of the conductor sheathing; (c) as a predominant longitudinal section of the entire wave conductor or of the conductor sheathing; and/or (d) as an entire longitudinal section of the entire wave conductor or of the conductor sheathing.

In this case, the cross-sections in the longitudinal direction are preferably arranged aligned in the longitudinal section. This means that in the case of a wave conductor extending only linearly, the cross-sections form a general cylinder extending in the longitudinal direction, a circular area being ruled out as a surface area for the cylinder. All other, preferably two-dimensional, surface areas, i.e., cross-sections of the longitudinal section, can in principle be used.

If the longitudinal section is arranged in the related longitudinal end section in the wave conductor or in the conductor sheathing, a cross-section of a free longitudinal end of this longitudinal end section can be formed circular on the outside, since the longitudinal section of the longitudinal end section is arranged 'behind' in the wave conductor. If the related longitudinal section is arranged at least as a longitudinal end section in the wave conductor or in the conductor sheathing, the cross-section of the free longitudinal end of the longitudinal section or longitudinal end section is thus formed radially outwardly non-circular. In both cases, the wave conductor can possess circular cross-sections at the outside, in a central region which is predominant relative to the related longitudinal section.

In embodiments, a related or the longitudinal section can have a circumferential section in which at least one outer circumference coding formation is provided. In this case, the outer circumference coding formation extends in the longitudinal direction, circumferential direction and radial direction of the wave conductor in the longitudinal section, which does not need to be straight. Furthermore, the outer circumference coding formation can be arranged as a positive outer circumference coding formation in the conductor sheathing. This means that the outer circumference coding formation is arranged positively as material at/in the conductor sheathing, which, through the addition of material (positive material), deviates from a circle at the outside.

Moreover, the outer circumference coding formation can be arranged as a negative outer circumference coding formation in the conductor sheathing. This means that the outer circumference coding formation is arranged negative as a removal/recess of a material of the conductor sheathing at/in the conductor sheathing, which deviates from a circle on the outside through the removal of material (negative material). A mixed form made up of a positive and a negative outer circumference coding formation can of course be used.

The outer circumference coding formation is preferably formed materially in one piece or integrally with the conductor sheathing. The outer circumference coding formation can optionally be formed partially straight, angular, (partly) round, (partly) oval, or (partly) elliptical and/or partly circular, etc. In this case, the outer circumference coding formation can extend in the radial direction in a sector-shaped and/or sectional manner (i.e. also in the circumferential direction) and optionally partially in the longitudinal direction and optionally partially circumferential direction.

In embodiments, at least one or the at least one outer circumference coding formation can be provided or arranged at/in the conductor sheathing such that the cross-sections in the longitudinal section respectively possess no or respectively possess one single radial axis of symmetry (first case). Alternatively, the number of radial axes of symmetry can correspond to half a number (second case) or a number (third case) of cross-section edges of the conductor core.

In the first case, the wave conductor is placeable in a single orientation in the waveguide connector. In the second case, the wave conductor is placeable in a number of orientations in a corresponding waveguide connector, which corresponds to half a number of cross-section edges of the conductor core. And in the third case, the wave conductor is placeable in a number of orientations in a corresponding waveguide connector, which corresponds to a number of cross-section edges of the conductor core. One, two or four such orientations are preferable. For this purpose, the waveguide connector preferably has at least one corresponding, at least partially complementary, in particular completely complementary, inner circumference coding formation.

In embodiments, the cross-sections of the longitudinal section can be formed as regular or irregular shapes with an n number of sides (polygons). Furthermore, the cross-sections of the longitudinal section can be formed substantially oval-shaped or elliptical. Moreover, the cross-sections of the longitudinal section can be formed circular in a first approach. Alternatively or additionally, the cross-sections of the longitudinal section can have a projection and/or a recess. In embodiments, the wave conductor is formed as a dielectric wave conductor.

The conductor core preferably has a thermoplastic plastics material, preferably PE, in particular LDPE. PE stands for a polyethylene and LD for 'low density', with LDPE (PE-LD) possessing highly branched polymer chains and thus a low density. The conductor sheathing preferably has a thermoplastic plastics material, preferably PP. PP stands for a polypropylene here. The wave conductor can further comprise an outer conductor sheathing, the outer conductor sheathing surrounding the conductor sheathing at least partially in the longitudinal direction and at least partially in the circumferential direction of the wave conductor. In addition, the conductor core, virtually as a conductor sheathing can, in turn, have a conductor core etc.

In embodiments, the wave conductor can have on its longitudinal end section a ferrule with an inner circumference coding formation and an outer coding, in particular an outer circumference coding formation. In this case, the outer circumference coding formation of the wave conductor is received in the inner circumference coding formation of the ferrule, wherein the outer circumference coding formation of the wave conductor or the orientation of the wave conductor is now represented by the outer circumference coding formation of the ferrule. Instead of a ferrule, a similar device can of course be used.

The inventive waveguide connector for electromagnetic waves has a wave conductor plug-in recess in which a longitudinal section of a wave conductor is directly placeable, said wave conductor plug-in recess having an inner circumference coding formation by means of which the wave conductor is placeable in at least one specific orientation in the wave conductor plug-in recess. 'Directly' is intended to be understood to mean "without a mechanical interposition of a further part or section of such a part." This means that the longitudinal section of the wave conductor can be received in the wave conductor plug-in recess in an unmediated manner.

In this case, the waveguide connector can be formed in a simple form as a ferrule or the like. Alternatively or additionally, the waveguide connector can be formed as a plug-in connector, an inline connector, a conductor coupling/cable coupling, a conductor connector/cable connector, a housing coupling/housing connector, a printed circuit board connector, an antenna coupler, optionally including antennas, etc. In embodiments, the wave conductor plug-in recess can possess cross-sections which deviate from a circle inside of the wave conductor plug-in recess. This means that the cross-section of the wave conductor plug-in recess in question is not formed circular and outwardly more or less deviates from a circle. In this case, this cross-section is perpendicular to a longitudinal direction of the wave conductor plug-in recess.

In embodiments, the inner circumference coding formation can be arranged as a positive inner circumference coding formation in/at the wave conductor plug-in recess. This means that the inner circumference coding formation is arranged positively as material in/at the wave conductor plug-in recess, which, through the addition of material (positive material), deviates inwardly from a circle.

Furthermore, the inner circumference coding formation can be arranged as a negative inner circumference coding formation at/in the wave conductor plug-in recess. This means that the inner circumference coding formation is arranged negatively as a removal/recess of a material at/in the wave conductor plug-in recess, which material constitutes the wave conductor plug-in recess, which deviates from a circle through the removal of material (negative material. A mixed form made up of a positive and a negative inner circumference coding formation can of course be used. The inner circumference coding formation is preferably formed materially in one piece or integrally with the wave conductor plug-in recess.

In embodiments, a cross-section of the wave conductor plug-in recess can be formed as a regular or an irregular n-sided shape (polygon). A cross-section of the wave conductor plug-in recess can further be formed substantially oval-shaped or elliptical. Moreover, a cross-section of the wave conductor plug-in recess can be formed circular in a first approach. Alternatively or additionally, a cross-section of the wave conductor plug-in recess can have a projection and/or a recess.

In embodiments, the wave conductor plug-in recess and the inner circumference coding formation of the waveguide connector can be formed partially complementary or complementary to a longitudinal section and an outer circumference coding formation of the wave conductor. The waveguide connector, in particular as a ferrule or a similar device, can have an outer coding, in particular an outer circumference coding formation. In this case, the wave conductor can be formed as a wave conductor according to the invention.

The inventive ready-made wave conductor for electromagnetic waves has an inventive wave conductor and/or an inventive waveguide connector. In this case, the ready-made wave conductor can also be described or formed as a ready-made waveguide cable. The ready-made wave conductor can be formed in general, for example, as a patch cable, an adaptor cable, a pigtail, etc.

The inventive communication link comprises at least one wave conductor and at least one waveguide connector for electromagnetic waves, wherein the communication links can be mutually orientated or are mutually orientated relative to one another by virtue of partially complementary or complementary circumference coding formations of the wave conductor and of the waveguide connector. The circumference coding formations can possess cross-sections which deviate from a circle. This means that the partially complementary or complementary cross-sections of the circumference coding formations in question are not formed circular and outwardly more or less deviate from a circle. In this case, these cross-sections are perpendicular to a longitudinal direction of the communication link.

Furthermore, the circumference coding formations on the one hand (wave conductor waveguide connector) can be arranged as a positive circumference coding formation and, on the other hand (waveguide connector/wave conductor), can be arranged as a negative circumference coding formation in the communication link. The communication link can have an inventive wave conductor, an inventive waveguide connector, and/or an inventive ready-made wave conductor.

The communication link can comprise a printed circuit board connector, mounted on a printed circuit board, and a wave conductor or ready-made wave conductor inserted therein. Furthermore, the communication link can comprise an antenna, an antenna coupler and a wave conductor or ready-made wave conductor which is inserted into the antenna coupler. In addition, the communication link can comprise an inline connector and two wave conductors or ready-made wave conductors inserted therein. Moreover, the communication link can comprise a housing coupling and a wave conductor or ready-made wave conductor inserted therein.

The inventive unit, the inventive device, the inventive subassembly, the inventive module, the inventive appliance or the inventive installation has an inventive wave conductor, an inventive waveguide connector, an inventive ready-made wave conductor, and/or an inventive communication link. Such a unit or device can be, for example, a printed circuit board or circuit board, an IC package, etc. Furthermore, such an appliance can be, for example, a computer, an infotainment unit, etc.

The invention is explained in greater detail below using exemplary embodiments with reference to the attached schematic drawings, which are not true to scale. Sections, elements, structural parts, units, diagrams, and/or components which possess an identical, univocal or similar design and/or function are identified by the same reference numbers in the description of the figures (see below), the list of reference numbers, the claims and in the figures (Figs.) of the drawings. Furthermore, a possible alternative which is not explained in the description of the invention (see above) and which is not illustrated in the drawings, and/or is inconclusive, a steady-state and/or kinematic reversal, a combination, etc., regarding the exemplary embodiments of the invention or a component, a diagram, a unit, a structural part, an element or a section thereof, can be inferred from the description of the figures.

In the invention, a feature (section, element, structural part, unit, component, function, variable etc.) can be configured to be positive, (i.e., present, or negative, i.e., absent), with a negative feature not being explicitly explained as a feature if the fact that it is absent is not deemed to be significant according to the invention. A feature of this specification (description, claims, drawings) can be applied not only in a specified manner but rather can also be applied in a different manner (isolation, summary, replacement, addition, in isolation, omission, etc.). In particular, by using a reference number and a feature associated with this, or vice versa, in the description, the claims and/or the drawings, it is possible to replace, add or omit a feature in the claims and/or the description. Moreover, a feature in a claim can be interpreted and/or specified in greater detail as a result.

The features of this specification can (in view of the (largely unknown) prior art) also be interpreted as optional features; (i.e., each feature can be understood as an optional, arbitrary or preferred feature, i.e., as a non-binding feature). It is thus possible to detach a feature, optionally including its periphery, from an exemplary embodiment, with this feature then being transferable to a generalized inventive concept. The lack of a feature (negative feature) in an exemplary embodiment shows that the feature is optional with regard to the invention. Furthermore, in the case of a type term for a feature, a generic term for the feature can also be read into this, (optionally further hierarchical classification into sub-genus, section, etc.), as a result of which it is possible to generalize a or this feature, (e.g., taking into account identical effect and/or equivalence).

DETAILED DESCRIPTION OF THE EMBODIMENT(S)

Figure 1:
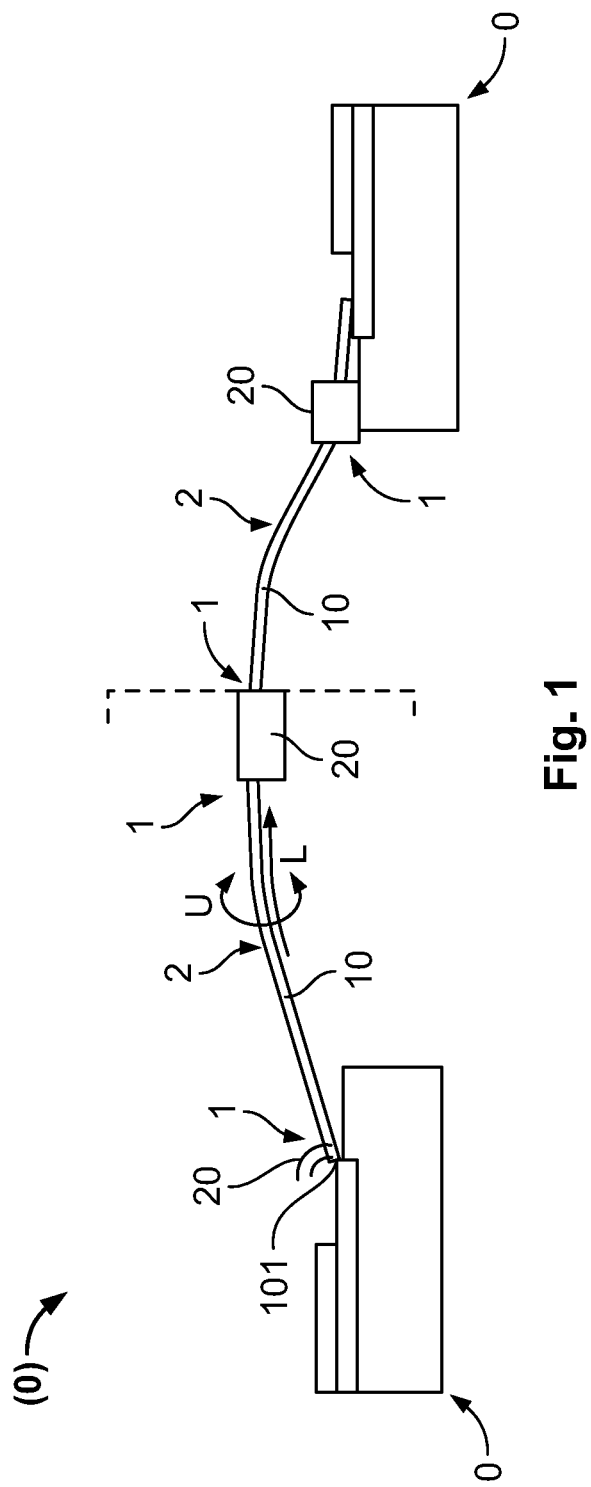
FIG. 1 shows a communication link for electromagnetic waves for a digital communication application according to the present invention.

The present invention is explained in greater detail below describing exemplary embodiments of a variant of a communication link, in particular of a millimeter-wave communication link for electromagnetic waves, and describing four embodiments of a variant of an inventive wave conductor, in particular a millimeter-wave wave conductor, and an inventive waveguide connector, in particular a millimeter-wave waveguide connector, for electromagnetic waves. Only those spatial sections of a subject-matter of the present invention which are necessary for understanding the present invention are illustrated in the drawings.

Although the present invention is more closely described and illustrated by way of preferred exemplary embodiments, the present invention is not restricted by the disclosed exemplary embodiments. Other variations can be derived therefrom and/or from the above without departing from the scope of protection of the invention. The inventive communication link, the inventive wave conductor, and/or the inventive waveguide connector can thus be used for electromagnetic waves outside the millimeter range, for example. The explanation of the present invention below relates to a longitudinal direction L or a longitudinal axis L, a radial direction R, and a circumferential direction U of the communication link 1, of a ready-made wave conductor 2, of the wave conductor 10, and/or of the waveguide connector 20.

FIG. 1 shows by way of example a plurality of inventive communication links 1 at/in at least one entity 0 which can be formed, for example, as a unit 0, a device 0, a subassembly 0, a module 0, an appliance 0, an installation 0, which (also) operates in an electrical, optical, or electro-optical manner. In this case, the illustrated positions of the communication links 1 are exemplary, with another communication link 1 also being able to be arranged at such a location. Furthermore, it is, of course, possible to form, in a manner, according to the present invention, a communication link 1 which is not illustrated. The communication link 1 can be formed as a reversible optical link (e.g., a preferable plug-in connection) or an irreversible optical link. The inventive communication link 1 has at least one wave conductor 10 or at least one ready-made wave conductor 2, and a waveguide connector 20.

The wave conductor 10 can also be referred to as a conductor, a fiber, a cable, etc. In embodiments of the present invention, the wave conductor 10 can have, on its related longitudinal section 130 or longitudinal end section 130, a ferrule or a similar device, which in this case does not act as a waveguide connector 20 but has a role of supporting the link. It is, of course, possible to form the wave conductor 10 without a ferrule or a similar device. This ferrule or similar device is preferably formed in a similar manner on a conductor sheathing 120 of the wave conductor 10 which is explained below.

In other embodiments of the invention, the ready-made wave conductor 2 can have, in addition to the wave conductor 10, at least one ferrule or a similar device on its related longitudinal section 130 or longitudinal end section 130, which, in this case, can act as a waveguide connector 20 or have a role of supporting the link. Furthermore, the ready-made wave conductor 2 can additionally or alternatively have at least one part of a waveguide connector 20 a snap connector for ferrules. It is, of course, possible to arrange a plurality of wave conductors 10 in an individual ready-made wave conductor 2. The ready-made wave conductor 2 can be formed, for example, in general, as a patch cable 2, an adaptor cable 2, a pigtail 2.

The flying or installed waveguide connector 20 can be constructed as a waveguide connector 20 as explained in the description of the present invention. Waveguide connector 20 can also be: an antenna coupler 20 optionally including an antenna; an inline connector 20 (e.g., as a flying waveguide connector 20); or a housing connector 20 (e.g., as an installed waveguide connector 20), which is mated with a, for example, flying plug-in connector (a housing for this second case is illustrated with dashed lines); and a printed circuit board connector 20.

Figure 2:
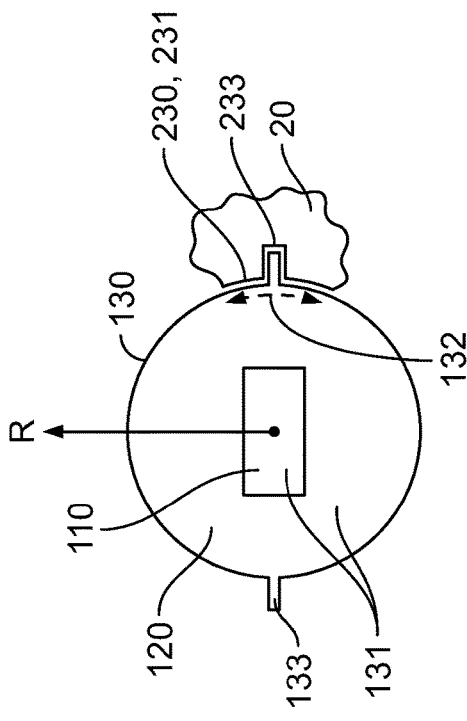
FIG. 2 shows a first embodiment of a wave conductor according to the present invention.
Figure 3:
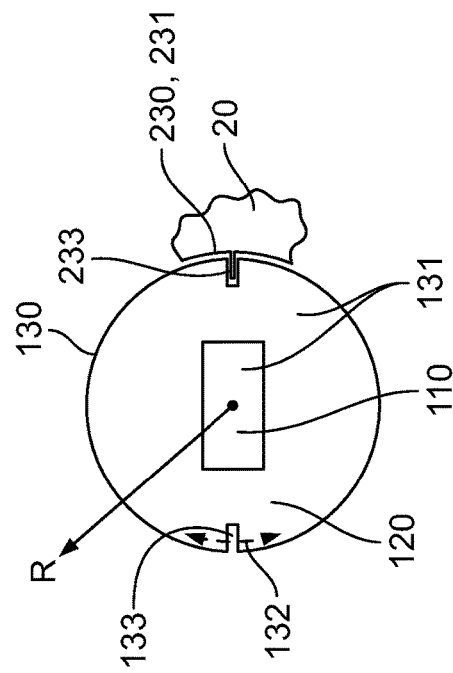
FIG. 3 shows a second embodiment of a wave conductor according to the present invention.
Figure 4:
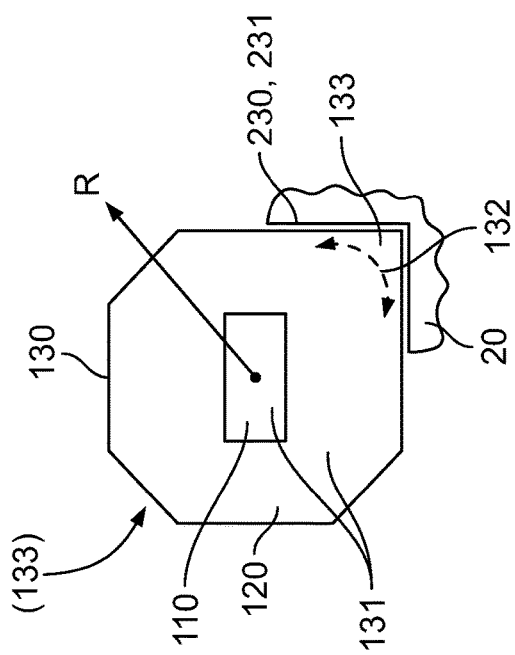
FIG. 4 shows a third embodiment of a wave conductor according to the present invention.

FIGS. 2 to 4 show exemplary embodiments of the wave conductor 10 which comprises two layers, one conductor core 110, and a conductor sheathing 120. It is, of course, possible to provide more than two layers. The conductor core 110 preferably possesses cross-sections which deviate from a circle, with rectangular or square cross-sections being preferable. It is optionally possible to use circular cross-sections of the conductor core 110. In order to keep optical coupling losses in a communication link 1 to a minimum, such a conductor core 110 should have a specific orientation inside the communication link 1, which orientation is aligned with an orientation, for example, of a conductor core of a second wave conductor.

According to the invention, this takes place at least by means of an outer circumference coding formation 133 of the conductor sheathing 120. This can take place, for example, by way of a projection, a recess, and/or a circumferential shaping of the conductor sheathing 120 in a longitudinal section 130, in particular at least inside a longitudinal end section 130, of the wave conductor 10. In this case, the longitudinal section 130 can be formed as a longitudinal end section 130 or as part of the longitudinal end section 130. Furthermore, the longitudinal section 130 can extend away across a predominant or entire longitudinal section of the wave conductor 10 or of the conductor core 110.

The outer circumference coding formation 133 confers on the longitudinal section 130 of the wave conductor 10, in its cross-sections 131, cross-sections 131 which deviate from circles on the outside of the conductor sheathing 120. As a result, with at least partially complementary cross-sections 231 of a wave conductor plug-in recess 230, the longitudinal section 130 of the wave conductor 10 is placeable in the wave conductor plug-in recess 230 in an oriented manner. The wave conductor plug-in recess 230 has an inner circumference coding formation 233 for this purpose. In this case, the wave conductor plug-in recess 230 can be a wave conductor plug-in recess 230: of a ferrule of the wave conductor 10, of a waveguide connector 20, of a ferrule of a waveguide connector 20, of a communication link 1. A similar device can be used instead of a ferule.

If the ferrule or the similar device is a part of the wave conductor 10 or the ready-made wave conductor 2, the ferrule or the similar device adopts a further coding. For this purpose, the ferrule or the similar device has an outer circumference coding formation, wherein this outer circumference coding formation may possess a form and/or position in the circumferential direction U, in the radial direction R, and/or in the longitudinal direction L which is different from that of the outer circumference coding formation of the conductor sheathing 120 but also may not be. In all embodiments, the wave conductor 10 can have an outer conductor sheathing over the conductor sheathing 120, which outer conductor sheathing can also partially or completely encase optionally the ferrule or optionally the similar device.

According to the present invention, the outer circumference coding formation 133 is arranged at least in a circumferential section 132 of the longitudinal section 130 of the conductor sheathing 120, the outer circumference coding formation 133 also, of course, extending in the radial direction R and/or in the longitudinal direction L. Apart from this, the longitudinal section 130 of the conductor sheathing 120 can have circular outer circumferential sections (see FIGS. 3 and 5) and/or can be formed to be mirror-symmetrical (see FIG. 2). Furthermore, oval or elliptical outer circumferential sections can be used for the longitudinal section 130 (see FIG. 4).

Figure 5:
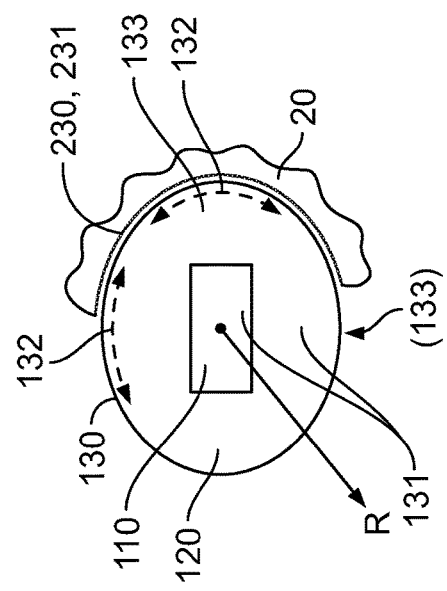
FIG. 5 shows a fourth embodiment of a wave conductor according to the present invention.

In embodiments of the present invention, the cross-sections 131 of the longitudinal section 130 can be formed as regular or irregular (FIG. 2) or partially regular (FIG. 2) n-sided shapes (FIG. 4). Furthermore, the cross-sections 131 of the longitudinal section 130 can be formed substantially oval-shaped or elliptical. Moreover, the cross-sections 131 of the longitudinal section 130 in a first approach can be formed circular, with these cross-sections 131, in a second approach, additionally having a projection 133 (FIG. 3) and/or a recess (FIG. 5). In this case, it is, of course, important to note that depending on a cross-sectional shape of the conductor core 110, it can be plugged in a correctly oriented manner.

The wave conductor plug-in recess 230 of the ferrule of the wave conductor 10, of the waveguide connector 20, of the ferrule of the waveguide connector 20, of the communication link 1, is formed partially complementary or complementary relative to the longitudinal section 130 of the wave conductor 10 in the circumferential direction U, wherein the outer diameters of the longitudinal section 130 correspond to the inner diameters of the wave conductor plug-in recess 230 (i.e., possess substantially the same values). In this case, it is, of course, important to note that the longitudinal section 130 is placeable in the wave conductor plug-in recess 230 and can be advanced therein.

If a ferrule with an outer circumference coding formation is used, the wave conductor plug-in recess 230 of the waveguide connector 20, of the communication link 1 is formed partially complementary or complementary relative to a longitudinal section of the ferrule in the circumferential direction U, wherein the outer diameters of this longitudinal section, similar to above, correspond to the inner diameters of the wave conductor plug-in recess 230 (i.e., possess substantially the same values). In this case, it is again important to note that the longitudinal section is placeable in the wave conductor plug-in recess 230 and can be advanced therein.

What is claimed is:

1. A wave conductor for electromagnetic waves comprising:
    a conductor core having a rectangular or a square cross-section;
    a conductor sheathing surrounding the conductor core at least partially in the longitudinal direction of the wave conductor and at least partially in the circumferential direction of the wave conductor, a dielectric constant of the conductor sheathing is less than a dielectric constant of the conductor core; and
    a longitudinal section having a cross-section which deviates from a circle at at least one of the outside of the wave conductor and at the outside of the conductor sheathing, the longitudinal section has a circumferential section in which at least one outer circumference coding formation is provided, the at least one outer circumference coding formation is provided or arranged on/in the conductor sheathing,
    wherein the longitudinal section of the wave conductor or of the conductor sheathing is formed on an end section of the wave conductor or of the conductor sheathing and wherein the longitudinal section is not formed as an entire longitudinal section of the wave conductor or of the conductor sheathing.

2. The wave conductor according to claim 1, wherein:
    (a) the outer circumference coding formation is arranged as a positive outer circumference coding formation in the conductor sheathing,
    (b) the outer circumference coding formation is arranged as a negative outer circumference coding formation in the conductor sheathing, and/or
    (c) the outer circumference coding formation is preferably formed materially in one piece or integrally with the conductor sheathing.

3. The wave conductor according to claim 2, wherein:
(a) the cross-sections of the longitudinal section are formed as regular or irregular n-sided shapes, or
(b) the cross-sections of the longitudinal section are formed substantially oval-shaped or elliptical, or
(c) the cross-sections of the longitudinal section are formed circular in a first approach, or
(d) the cross-sections of the longitudinal section have a projection and/or a recess, and/or
(e) the wave conductor has, on its longitudinal end section, a ferrule with an inner circumference coding formation and an outer coding, in particular an outer circumference coding formation.

4. An electrical and/or optical unit, electrical and/or optical device, electrical and/or optical subassembly, electrical and/or optical module, electrical and/or optical appliance, or electrical and/or optical installation comprising a wave conductor according to claim 1.

5. The wave conductor according to claim 1, wherein the cross-sections of the longitudinal section define a projection.

6. The wave conductor according to claim 5, wherein the cross-sections of the longitudinal section define an irregular polygon.

7. A waveguide connector for a wave conductor of electromagnetic waves, comprising:
a wave conductor plug-in recess that has an inner circumference coding formation, a longitudinal section of the wave conductor disposed directly in the wave conductor plug-in recess at a specific orientation of the wave conductor plug-in recess, the wave conductor plug-in recess and the inner circumference coding formation are formed partially complementary or complementary to a longitudinal section and to an outer circumference coding formation of the wave conductor, the cross-sections in the longitudinal section of the outer circumference coding formation each possess one single radial axis of symmetry, or the number of radial axes of symmetry corresponds to half a number or a number of cross-section edges of a conductor core of the wave conductor, the conductor core having a rectangular or a square cross-section,
wherein the longitudinal section of the wave conductor or of the conductor sheathing is formed on an end section of the wave conductor or of the conductor sheathing and wherein the longitudinal section is not formed as an entire longitudinal section of the wave conductor or of the conductor sheathing.

8. The waveguide connector according to claim 7, wherein:
(a) the wave conductor plug-in recess has cross-sections which deviate from a circle at the inside of the wave conductor plug-in recess,
(b) the inner circumference coding formation is arranged as a positive inner circumference coding formation in the wave conductor plug-in recess,
(c) the inner circumference coding formation is arranged as a negative inner circumference coding formation in the wave conductor plug-in recess, and/or
(d) the inner circumference coding formation is preferably formed materially in one piece or integrally with the wave conductor plug-in recess.

9. The waveguide connector according to claim 8, wherein:
(a) a cross-section of the wave conductor plug-in recess is formed as a regular or an irregular n-sided shape, or
(b) a cross-section of the wave conductor plug-in recess is formed substantially oval-shaped or elliptical, or
(c) a cross-section of the wave conductor plug-in recess is formed circular in a first approach, or
(d) a cross-section of the wave conductor plug-in recess has a projection and/or a recess, and/or
(e) the waveguide connector has an outer coding, in particular the outer circumference coding formation.

10. A ready-made wave conductor for electromagnetic waves having a wave conductor and a waveguide connector according to claim 9.

11. An electrical and/or optical unit, electrical and/or optical device, electrical and/or optical subassembly, electrical and/or optical module, electrical and/or optical appliance, or electrical and/or optical installation comprising a ready-made wave conductor according to claim 10.

12. An electrical and/or optical unit, electrical and/or optical device, electrical and/or optical subassembly, electrical and/or optical module, electrical and/or optical appliance, or electrical and/or optical installation comprising a waveguide connector according to claim 7.

13. The waveguide connector according to claim 7, wherein the cross-sections of the longitudinal section define an irregular polygon.

14. A communication link for electromagnetic waves comprising:
a first link having:
(a) a first wave conductor having a conductor core and a conductor sheathing surrounding the conductor core, a longitudinal section of the first wave conductor has a circumferential section with an outer circumference coding formation provided or arranged on/in the conductor sheathing, and
(b) a first waveguide connector having a partially complementary or complementary inner circumference coding formation with the outer circumference coding formation of the first wave conductor; and
a second link having:
(a) a second wave conductor, and
(b) a second waveguide connector having a partially complementary or complementary circumference coding formation with the second wave conductor;
whereby, the first link and the second link can be mutually orientated or are mutually orientated relative to one another,
wherein the longitudinal section of the first wave conductor or of the conductor sheathing is formed on an end section of the first wave conductor or of the conductor sheathing and wherein the longitudinal section is not formed as an entire longitudinal section of the first wave conductor or of the conductor sheathing.

15. The communication link according to claim 14, wherein the circumference coding formation is arranged in the communication link in a positive circumference coding formation and in a negative circumference coding formation.

16. The communication link according to claim 15, further including one or more of the following:
(a) a printed circuit board connector mounted on a printed circuit board with a wave conductor or ready-made wave conductor inserted therein,
(b) an antenna, an antenna coupler, and a wave conductor or ready-made wave conductor inserted into the antenna coupler,
(c) an inline connector and two wave conductors or ready-made wave conductors inserted therein, and
(d) a housing coupling and a wave conductor or ready-made wave conductor inserted therein.

17. The communication link according to claim 15, further including a wave conductor, a waveguide connector and/or a ready-made wave conductor.

18. An electrical and/or optical unit, electrical and/or optical device, electrical and/or optical subassembly, electrical and/or optical module, electrical and/or optical appliance, or electrical and/or optical installation comprising a communication link according to claim 14.

19. The communication link according to claim 14, wherein the cross-sections of the longitudinal section define an irregular polygon.

\* \* \* \* \*